Feb. 4, 1969 — L. M. SKYPALA — 3,426,177
HEATER DUCT ARRANGEMENT
Filed Aug. 24, 1966

INVENTOR.
LOUIS M. SKYPALA
BY William R. Nolte
AGENT

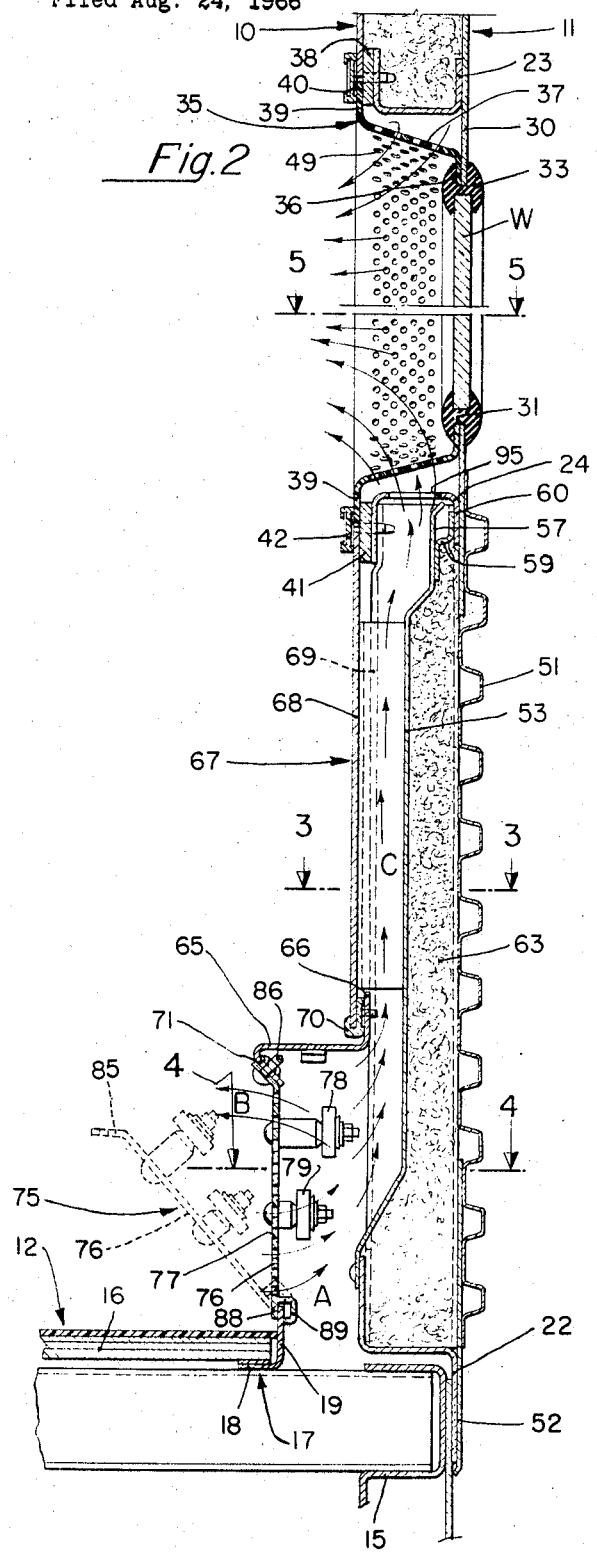
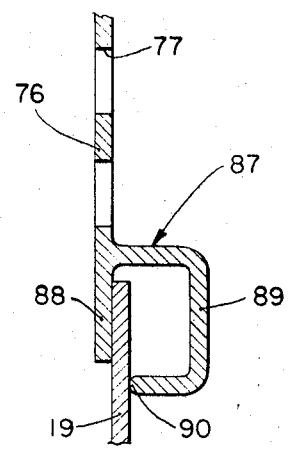

United States Patent Office 3,426,177
Patented Feb. 4, 1969

3,426,177
HEATER DUCT ARRANGEMENT
Louis M. Skypala, Montgomery County, Pa., assignor to The Budd Company, Philadelphia, Pa., a corporation of Pennsylvania
Filed Aug. 24, 1966, Ser. No. 574,669
U.S. Cl. 219—213                2 Claims
Int. Cl. H05b 1/00; F24h 9/02, 3/00

ABSTRACT OF THE DISCLOSURE

A floor heater arrangement in which air flow is directed upwardly through side wall structure of a vehicle to sweep a window area. Heater elements are secured to a panel having bifurcated clips engaging planar portions which extend upwardly from the floor.

---

This invention relates to a heater duct arrangement, more particularly to a heater duct arrangement especially adapted for mobile passenger vehicles such as passenger railcars.

The heating arrangement of the present invention as used in a passenger vehicle is disposed along the intersection of the floor and sidewalls and communicates upwardly through openings in longitudinal structural members to window mask molding surrounding the windows. The window mask molding includes a perforation pattern to enable full hot air coverage of the inside window surface. The base of the ducting structure adjacent the floor constitutes a mounting for heater element and includes a slip joint connection which enables quick installation and service therefor.

Accordingly, it is the principal object of this invention to provide a new and improved heating arrangement for passenger vehicles which avoids one or more of the disadvantages of the prior art arrangements.

It is another important object of this invention to provide an improved heater panel duct assembly for a railcar which facilitates easy installation of the heater elements and which facilitates cleaning of the railcar.

For a better understanding of the invention together with other and further objects thereof reference is had to the following description taken in conjunction with the accompanying drawings and its scope will be pointed out in the appended claims.

In the drawings FIG. 1 is a side elevational view of a railway car with a portion of its internal wainscoting removed to expose the ducting interiorly of the sidewall and terminating adjacent the windows of the car;

FIG. 2 is a vertical sectional view taken along the line 2—2 of FIG. 1 through the window portion of the sidewall of the car;

FIG. 6 is an enlarged view of the slip joint connection between the heater panel and the floor structure of the car.

Figure 1:
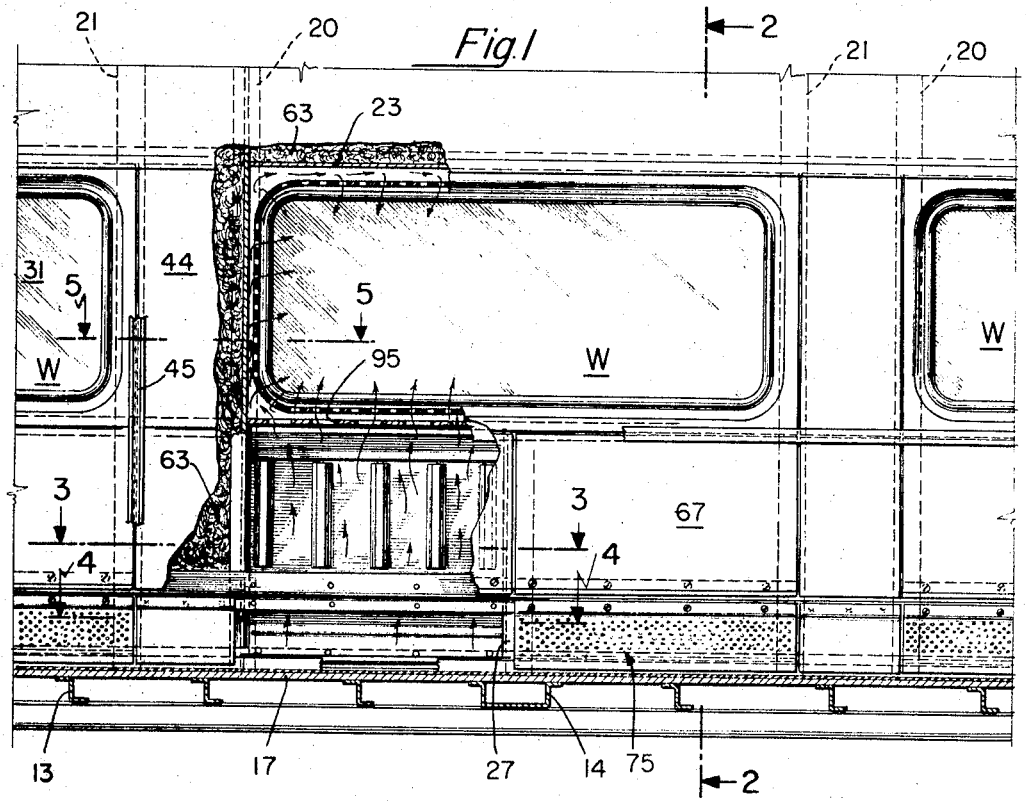
Figure 3:
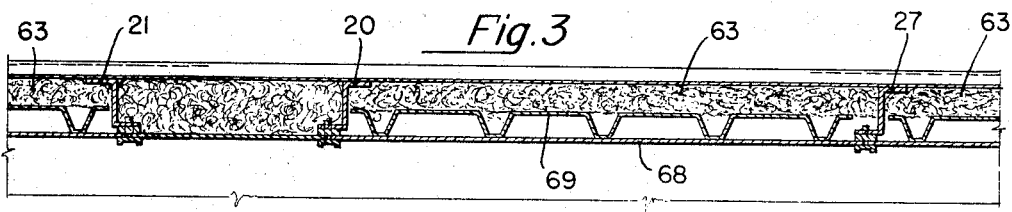
FIG. 3 is a horizontal sectional view taken along the line 3—3 of FIG. 1 beneath the window portions of the sidewall of the car.
Figure 4:
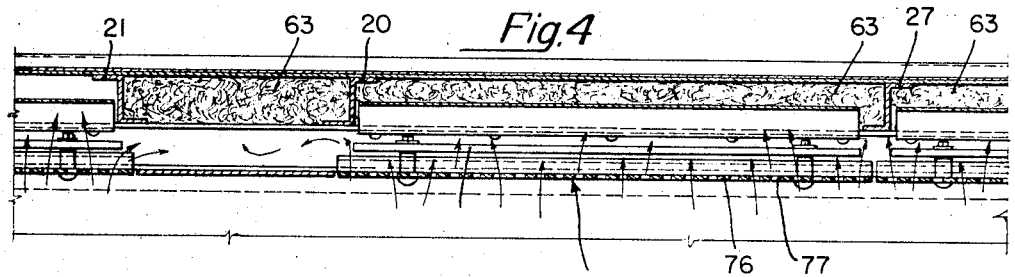
FIG. 4 is a horizontal sectional view taken along the line 4—4 of FIG. 1 through the sidewall of the car adjacent the floor.

Referring now to the drawings in which like characters of reference designate like parts in the various views, FIGS. 1 and 2 illustrate a railway car body 10 manufactured of sheet metal stainless steel parts. The car body 10, only a portion of which is shown, comprises sidewall frames 11 and a floor frame 12. The latter includes a plurality of Z-shaped transverse floor beams 13 and channel beams 14, the outer ends of which are supported within a channel shaped side sill 15. A plymetal flooring 16 is supported on the top surfaces of the beams and is bounded on its side edges by angle member 17. The flooring overlaps horizontal flange 18 of the angle and terminates adjacent the upright flange 19 which extends slightly above the top surface of the flooring.

As seen in FIGS. 1 and 2, the sidewall panel unit 11 includes a window sash W which is framed by a pair of vertical posts 20, 21 of Z cross-section, secured at their bottom ends to bottom longitudinal cord 22, and by upper window rail 23 and lower window rail 24. The rails 23 and 24 are of channel construction and have their flanges disposed in a direction away from the horizontal window margins and are secured at their outer ends to the upright posts 20, 21. A lower stiffener 27 spaced midway between the window is secured at its upper end to lower window rail 24 and to bottom cord 22. An upper exterior sheating panel 30 is suitably secured to the upper outer flanges of posts 20, 21 and to upper and lower window rails 23, 24. The panel includes a suitable opening 31 into which is received rubber glazing strip 33 having window sash mounted therein.

Figure 5:
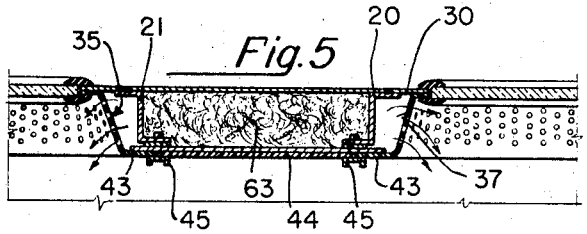
FIG. 5 is a horizontal sectional view taken along the line 5—5 of FIG. 1 through the deadlight area of the sidewall of the car.

A rectangular window mask 35 includes an inner perimeter in the form of flange 36 which is also received within the glazing strip 33, a transverse central portion 37 extending the width of the wall section, and an outer perimeter in the form of an outturned flange portion 39. The outer perimeter of the mask is attached to upper window rail 23 by means of spacer strip 38 and by bolt strip sealing means 40. The lower marginal flange 39 of the window mask is likewise secured to the inner flange of lower window rail 24 by means of spacer 41 and bolt strip sealing means 42. As seen in FIG. 5 the opposite end flange portions 43 of the mask and interior deadlight panels 44 are secured to inner flanges of upright posts 20, 21 by bolt strips 45. The transverse interior portion 37 of the window mask includes a pattern of perforations extending all around the window as at 49.

Extending exteriorly of the upright posts 20, 21 and beneath the window opening, a longitudinal corrugated panel 51 is shown in overlapping engagement with the lower margin of upper sheathing 30 above and with lower panel 52 disposed exteriorly of bottom cord member 22 below. An insulation retainer panel 53 including an inwardly inclined base portion 54 is secured to the upstanding flange 55 of longitudinal bottom cord 22 as by bolts 56. The upper end of the insulation panel includes an outwardly jogged portion 57 which coacts with a jogged member 59 secured to the inner face of outer 60 of window rail 24. a suitable insulation material 63 such as spun glass is received between the outer skin 30, 51, 52 and the insulation retaining panel 53.

A longitudinal seat rail support 65 disposed above inclined portion 54 of retainer panel 53 is suitably secured as by welding its upstanding flange 66 to the inner flanges of post 20, 21. A wainscot panel assembly 68, comprising a finish panel 68 defining an interior decorative surface of the railcar, and an interior vertically corrugated panel 69 fastened to its inner surface, is secured along its top margins by the aforementioned bolt strip 42. The lower margin of the assembly is secured by means of lower bolt strip 70 in overlapping engagement with the upstanding flange 66 of seat rail 65. The latter seat rail includes an inboard downturned flange portion 71 which is inclined toward the intersection of the sidewall and floor of the car.

A heater panel assembly 75 comprising a panel 76 apertured as at 77 and carrying a plurality of heating elements 78, 79 on its inside face extends between the seat rail 65 and upstanding flange 19 of angle member 18 of the floor structure. In order to facilitate its mounting therebetween the upper marginal edge is inclined as at 85 to match the inclination of the downturned flange 71 and is secured thereto as by bolts 86.

In order to permit easy insertion of the heater panel assembly 75 slip joint means 87 are provided between the panel and the floor structure. As best seen in FIGS. 2 and 6 the slip joint means comprise a bifurcated connection between the panel and the floor structure. The bifurcation consists of a first arm portion 88 which is coplanar with the panel 76 and a second arm portion 89 thereof extending from its inner face and in the reverse form of the letter C. The extremity 90 of arm 89 terminates a distance from arm 88 which corresponds to the thickness of upright flange 19 of angle member 18 and operates to maintain the panel in an upright position without slack when the upper edge of the panel is secured by bolts 86. Prior to such securement the panel assembly may be slipped onto the angle 17 as illustrated in the phantom position, FIG. 2, and such joint serves as a pivot connection to rotate the same upwardly to its normal full line position.

With the heater elements 78, 79 suitably electrically connected, air flow about the heater elements through perforations 77 in panel 76 may be in the direction within the ducting as illustrated by arrows A and out of the ducting and into the interior of the car by arrows B. Moreover airflow may be directed upwardly within the wall structure between the ducting formed by wainscot panel 67, vertically corrugated panel 69 and insulation retaining panel 63. The lower window channel rail 24 is apertured as at 95 thereby permitting hot air flow travel indicated by arrows C to pass through said perforations 49 of window mask 35. As seen in FIG. 5 the inclined transverse central portion 37 of mask 35 is spaced from the central web portions of post 20, 21 to define an air duct therebetween. Air is thus enabled to traverse the windows in a longitudinal fore and aft direction emanating from the dead light areas of the windows.

While the previously referred to slip joint means comprising bifurcation 88, 89 is shown integral with panel 76, it is apparent that the same could be transposed so as to be affixed to flange 19 of angle 18 or conversely such slip joint connection means could be employed along the top margin of the panel 76 to extend between seat support 65 and the panel.

While there have been described what are at present considered to be the preferred embodiments of the invention, it will be obvious to those skilled in the art that various changes and modifications may be made therein without departing from the invention and it is aimed in the appended claims to cover all such changes and modifications as fall within the true spirit and scope of the invention.

What is claimed is:

1. A heater arrangement for a railcar having a floor and a sidewall structure, the latter having a window opening and comprising in combination a pair of upright posts, one each disposed on each side by said opening, an upper and a lower window rail each secured at its opposite ends to said upright posts, external and internal sheathing means defining air duct means therebetween, perforated mask means having an interior margin encircling a window sash and secured to said external sheathing, said mask means having an outer margin secured to said internal sheathing, panel means disposed between said interior sheathing and said floor, heater elements mounted on said panel and communicating with said duct means, said panel means including perforation to enable air flow therethrough and around said heater elements, and means securing said perforated panel means to said floor, said securing means having bifurcated means integral with said panel means, and wherein said floor includes an upstanding planar portion gripped by said bifurcated means.

2. In the heater arrangement as set forth in claim 1 wherein said bifurcated means include a first finger portion coplanar with said panel means and second bowed finger means connected to the first finger means and having an extremity spaced from said first finger means a distance corresponding to the thickness of said upstanding planar portion.

References Cited

UNITED STATES PATENTS

| | | | |
|---|---|---|---|
| 515,401 | 2/1894 | Hatch | 219—352 |
| 1,853,477 | 4/1932 | Van Vulpen et al. | 165—57 X |
| 1,921,040 | 8/1933 | Reynolds | 165—57 |
| 2,179,873 | 11/1939 | Anderson et al. | 237—45 |
| 2,375,556 | 5/1945 | Hupp | 165—57 X |

FOREIGN PATENTS 360,571  11/1931  Great Britain.

RICHARD M. WOOD, *Primary Examiner.*

C. L. ALBRITTON, *Assistant Examiner.*

U.S. Cl. X.R.

98—31, 91; 165—57; 219—345, 374; 237—45